(12) United States Patent
Liu et al.

(10) Patent No.: US 9,288,247 B2
(45) Date of Patent: Mar. 15, 2016

(54) METHODS AND APPARATUS FOR IMPROVED NAVIGATION OF CONTENT INCLUDING A REPRESENTATION OF STREAMING DATA

(75) Inventors: Huanglingzi Liu, Beijing (CN); Yonggang Guo, Beijing (CN)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 14/400,332

(22) PCT Filed: May 14, 2012

(86) PCT No.: PCT/CN2012/075471
§ 371 (c)(1),
(2), (4) Date: Mar. 26, 2015

(87) PCT Pub. No.: WO2013/170427
PCT Pub. Date: Nov. 21, 2013

(65) Prior Publication Data
US 2015/0312297 A1    Oct. 29, 2015

(51) Int. Cl.
| H04L 29/06 | (2006.01) |
| H04N 21/433 | (2011.01) |
| H04N 21/458 | (2011.01) |
| H04N 21/488 | (2011.01) |
| H04L 29/08 | (2006.01) |
| H04N 21/431 | (2011.01) |

(52) U.S. Cl.
CPC ........ *H04L 65/4092* (2013.01); *H04L 65/4084* (2013.01); *H04L 67/1095* (2013.01); *H04N 21/4316* (2013.01); *H04N 21/4331* (2013.01); *H04N 21/458* (2013.01); *H04N 21/488* (2013.01)

(58) Field of Classification Search
CPC ............ H04L 65/4084; H04L 65/4092; H04L 67/1095; H04N 21/4316; H04N 21/4331; H04N 21/458; H04N 21/488
See application file for complete search history.

(56) References Cited

U.S. PATENT DOCUMENTS

| 9,002,881 | B2* | 4/2015 | Bocharov | H04L 65/4084 707/770 |
| 2010/0119208 | A1* | 5/2010 | Davis | H04N 5/765 386/291 |
| 2012/0016935 | A1* | 1/2012 | Huang | H04M 3/42017 709/203 |

FOREIGN PATENT DOCUMENTS

| CN | 101867665 A | 10/2010 |
| WO | 2010/054222 A1 | 5/2010 |
| WO | 2011/059657 A2 | 5/2011 |

OTHER PUBLICATIONS

International Search Report and Written Opinion received in Patent Cooperation Treaty Application No. PCT/CN2012/075471, dated Feb. 14, 2013, 8 pages.

*Primary Examiner* — Michael C Lai
(74) *Attorney, Agent, or Firm* — Banner & Witcoff, Ltd.

(57) ABSTRACT

Methods, apparatuses, and computer program products are herein provided for improved navigation of content with streaming media. A method may include causing presentation of a document with at least one representation of streaming media on a display and causing presentation of a media download indicator on the display that provides an indication of download progress of the representation of streaming media. The method may further include causing presentation of content that does not include the representation of streaming media while causing the media download indicator to remain presented and then receiving an indication that a user desires to view the representation of streaming media. The method may further include causing, in response to the indication, presentation of a portion of the document that includes the representation of the streaming media on the display. Corresponding apparatuses and computer program products are also provided.

20 Claims, 18 Drawing Sheets

METHODS AND APPARATUS FOR IMPROVED NAVIGATION OF CONTENT INCLUDING A REPRESENTATION OF STREAMING DATA

RELATED APPLICATION

This application was originally filed as Patent Cooperation Treaty Application No. PCT/CN2012/075471 filed May 14, 2012.

TECHNOLOGICAL FIELD

An example embodiment of the present invention relates generally to user interface technology and, more particularly, relates to methods, apparatuses, and computer program products for improved navigation of content including a representation of streaming media.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

Increased functionality of mobile computing devices has enabled mobile computing devices to perform many functions, including providing streaming media (e.g., videos). However, depending on the file size of the streaming media and the processing power of the mobile computing device, time may be required for downloading the streaming media.

BRIEF SUMMARY

Often, a representation of the streaming media may be within a document, such as a website. An impatient user may scroll through the document, or even open a new document, while the streaming media downloads to the mobile computing device. This scrolling may ultimately leave the user at a portion of the document that does not include the streaming media when the downloading completes and the streaming media is ready to play. As such, some embodiments of the present invention enable a user to easily return to the portion of the document that includes a representation of the streaming media. In particular, a media download indicator may be presented to the user with the document. The media download indicator may provide the user with an indication of the download progress of the streaming media. Additionally, the media download indicator may remain presented on the display despite the current content (e.g., a different portion of the document, a different document, etc.) that is being presented, thereby enabling the user to constantly view the download progress of the streaming media while viewing different content (e.g., scrolling through the document). Moreover, a user may simply select the media download indicator to quickly return to the portion of the document that includes the representation of the streaming media.

Embodiments of the present invention provide methods, apparatuses, and computer program products for improved navigation of content including a representation of streaming media. In one example embodiment, a method includes causing presentation of a document on a display, wherein the document comprises at least one representation of streaming media. The method further includes causing presentation of a media download indicator on the display, wherein the media download indicator provides an indication of download progress of the at least one representation of streaming media. The method further includes causing presentation of content that does not include the at least one representation of streaming media while causing the media download indicator to remain presented on the display. The method further includes receiving an indication that a user desires to view the at least one representation of streaming media after causing presentation of the content that does not include the at least one representation of streaming media. The method further includes causing, in response to the indication that the user desires to view the at least one representation of streaming media, presentation of a portion of the document that includes the at least one representation of streaming media on the display.

In some embodiments, the method may further include causing presentation of the content that does not include the at least one representation of streaming media while causing the media download indicator to remain presented on the display by permitting scrolling through the document while the media download indicator remains presented on the display.

In some embodiments, the method may include causing presentation of the media download indicator on the display by causing presentation of the media download indicator on the display within the document. In some embodiments, the method may include causing presentation of the media download indicator on the display by causing presentation of the media download indicator on the display within a header or a footer of the document.

In some embodiments, the method may include causing presentation of the media download indicator on the display by causing presentation of the media download indicator on the display in response to receiving a selection of the at least one representation of streaming media. In some embodiments, the method may include causing presentation of the media download indicator on the display by automatically causing presentation of the media download indicator on the display in an instance in which the document comprises at least one representation of streaming media.

In some embodiments, the media download indicator may provide an indication of the operation status of the at least one representation of streaming media. Additionally or alternatively, the media download indicator may provide a title of the at least one representation of streaming media. Additionally or alternatively, the media download indicator may provide a function for scrolling between more than one representation of streaming media.

In some embodiments, the method may further include causing presentation of a second media download indicator on the display, wherein the second media download indicator provides an indication of download progress of a second representation of streaming media. The method may further include receiving a second indication that the user desires to view the second representation of streaming media. The method may further include causing, in response to the second indication, presentation of a second portion of the document that includes the second representation of streaming media on the display.

In another example embodiment, an apparatus is provided that includes at least one processor and at least one memory storing computer program code, wherein the at least one memory and stored computer program code are configured, with the at least one processor, to cause the apparatus to cause presentation of a document on a display, wherein the document comprises at least one representation of streaming media. The at least one memory and stored computer program code are configured, with the at least one processor, to further cause the apparatus to cause presentation of a media download indicator on the display, wherein the media download indicator provides an indication of download progress of the at least one representation of streaming media. The at least one memory and stored computer program code are configured, with the at least one processor, to further cause the apparatus to cause presentation of content that does not include the at least one representation of streaming media while causing the media download indicator to remain presented on the display. The at least one memory and stored computer program code are configured, with the at least one processor, to further cause the apparatus to receive an indication that a user desires to view the at least one representation of streaming media after causing presentation of the content that does not include the at least one representation of streaming media. The at least one memory and stored computer program code are configured, with the at least one processor, to further cause the apparatus to cause, in response to the indication that the user desires to view the at least one representation of streaming media, presentation of a portion of the document that includes the at least one representation of streaming media on the display.

In another example embodiment, a computer program product is provided. The computer program product of this example embodiment includes at least one computer-readable storage medium having computer-readable program instructions stored therein. The program instructions of this example embodiment comprise program instructions configured to cause an apparatus to perform a method including causing presentation of a document on a display, wherein the document comprises at least one representation of streaming media. The method further includes causing presentation of a media download indicator on the display, wherein the media download indicator provides an indication of download progress of the at least one representation of streaming media. The method further includes causing presentation of content that does not include the at least one representation of streaming media while causing the media download indicator to remain presented on the display. The method further includes receiving an indication that a user desires to view the at least one representation of streaming media after causing presentation of the content that does not include the at least one representation of streaming media. The method further includes causing, in response to the indication that the user desires to view the at least one representation of streaming media, presentation of a portion of the document that includes the at least one representation of streaming media on the display.

In another example embodiment, an apparatus is provided. The apparatus comprises means for causing presentation of a document on a display, wherein the document comprises at least one representation of streaming media. The apparatus further includes means for causing presentation of a media download indicator on the display, wherein the media download indicator provides an indication of download progress of the at least one representation of streaming media. The apparatus further includes means for causing presentation of content that does not include the at least one representation of streaming media while causing the media download indicator to remain presented on the display. The apparatus further includes means for receiving an indication that a user desires to view the at least one representation of streaming media after causing presentation of the content that does not include the at least one representation of streaming media. The apparatus further includes means for causing, in response to the indication that the user desires to view the at least one representation of streaming media, presentation of a portion of the document that includes the at least one representation of streaming media on the display.

BRIEF DESCRIPTION OF THE DRAWINGS

Figure 1:
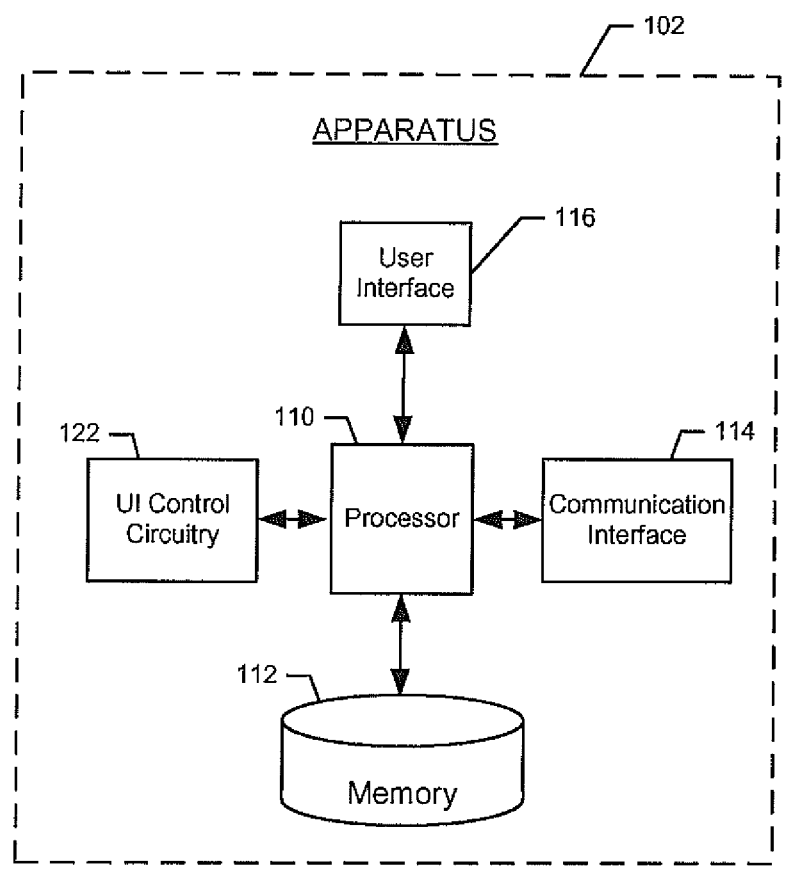
Figure 2:
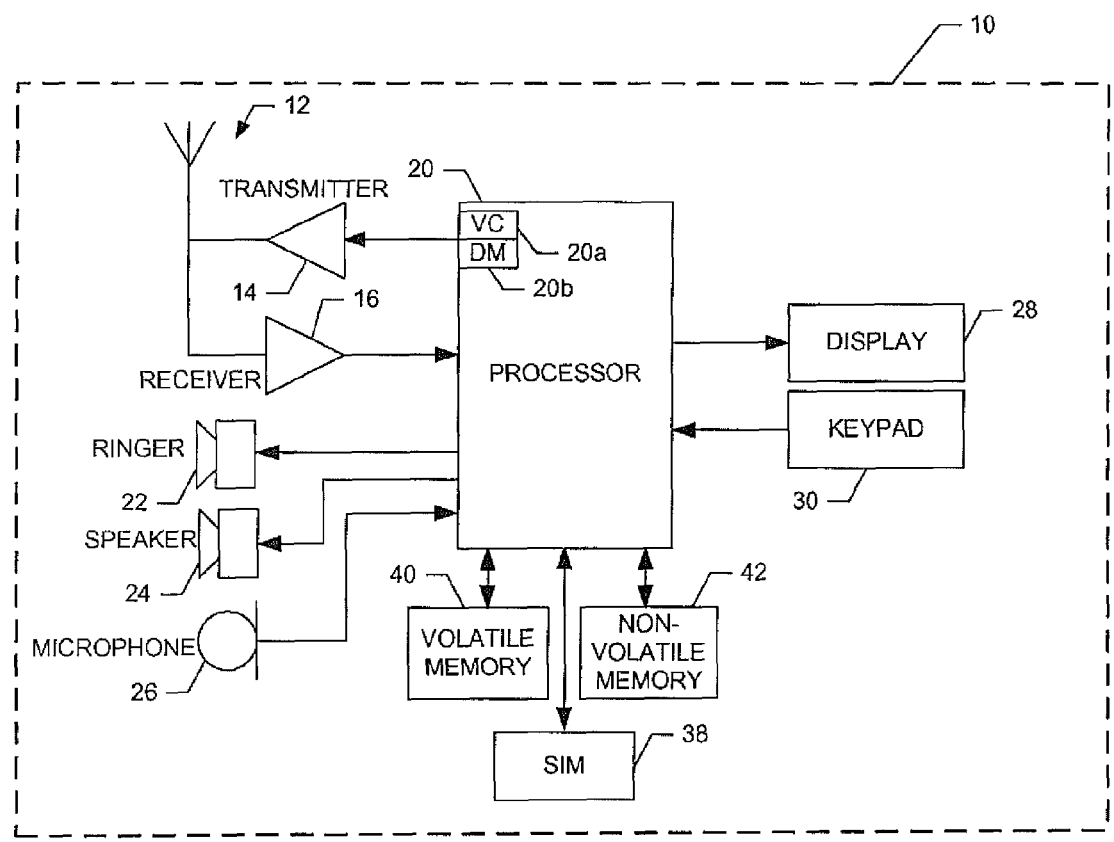
Figure 3:
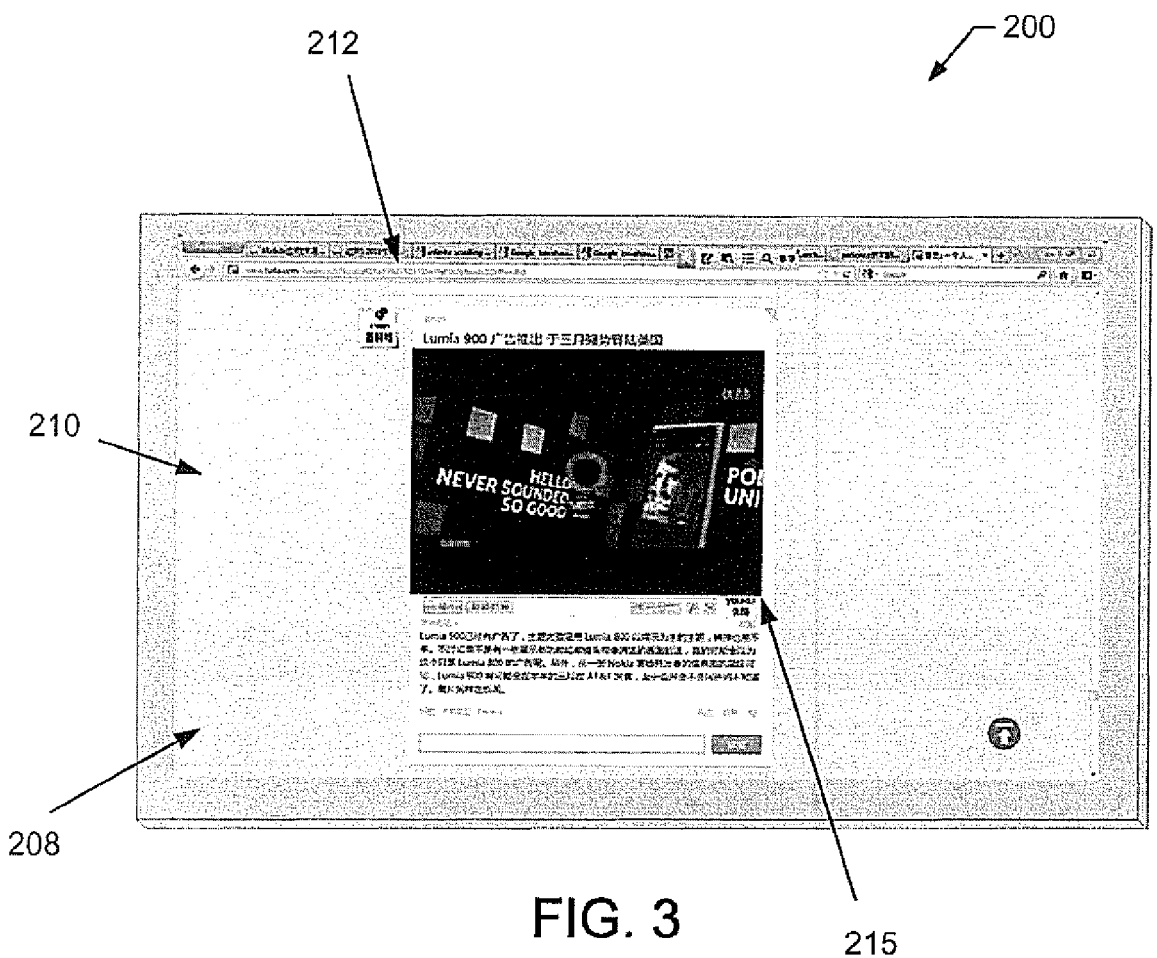
Figure 4:
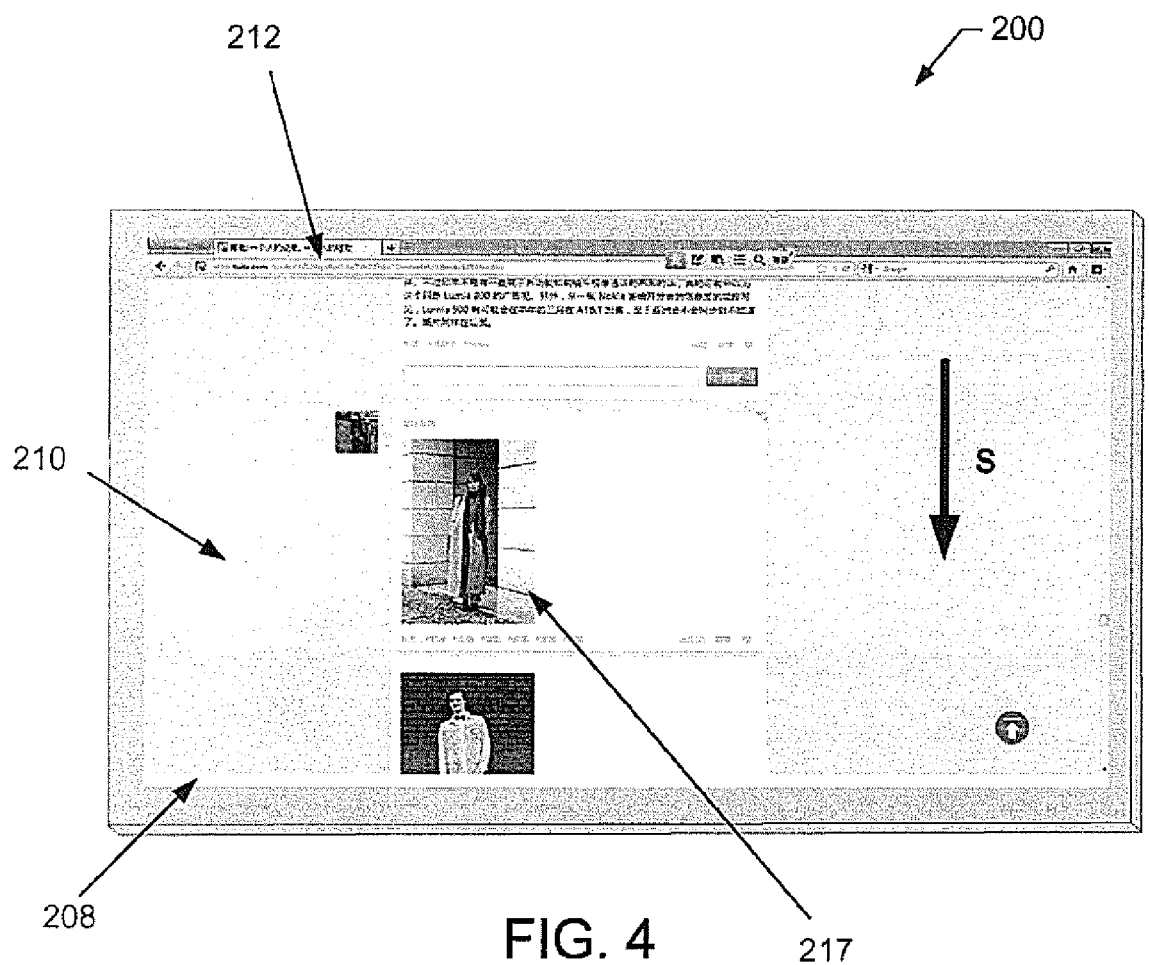
Figure 5A:
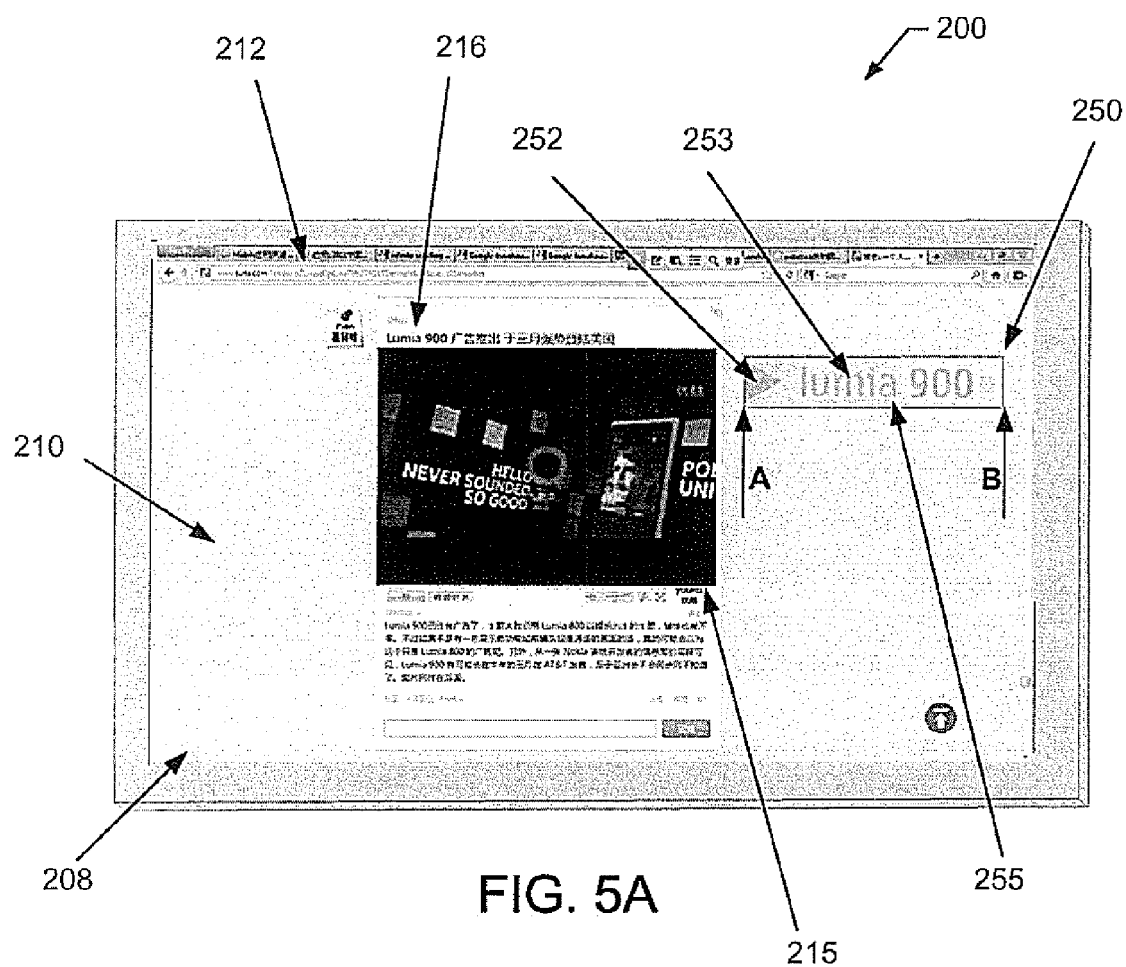
Figure 5B:
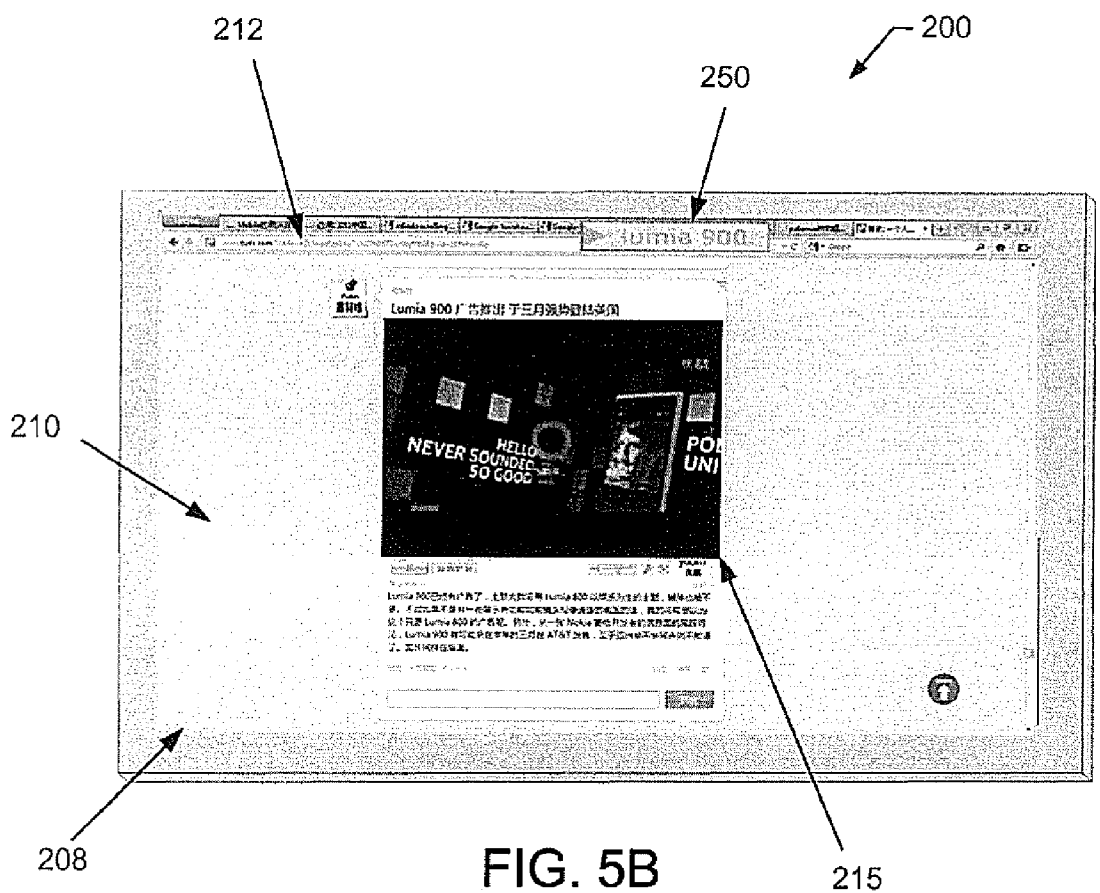
Figure 6:
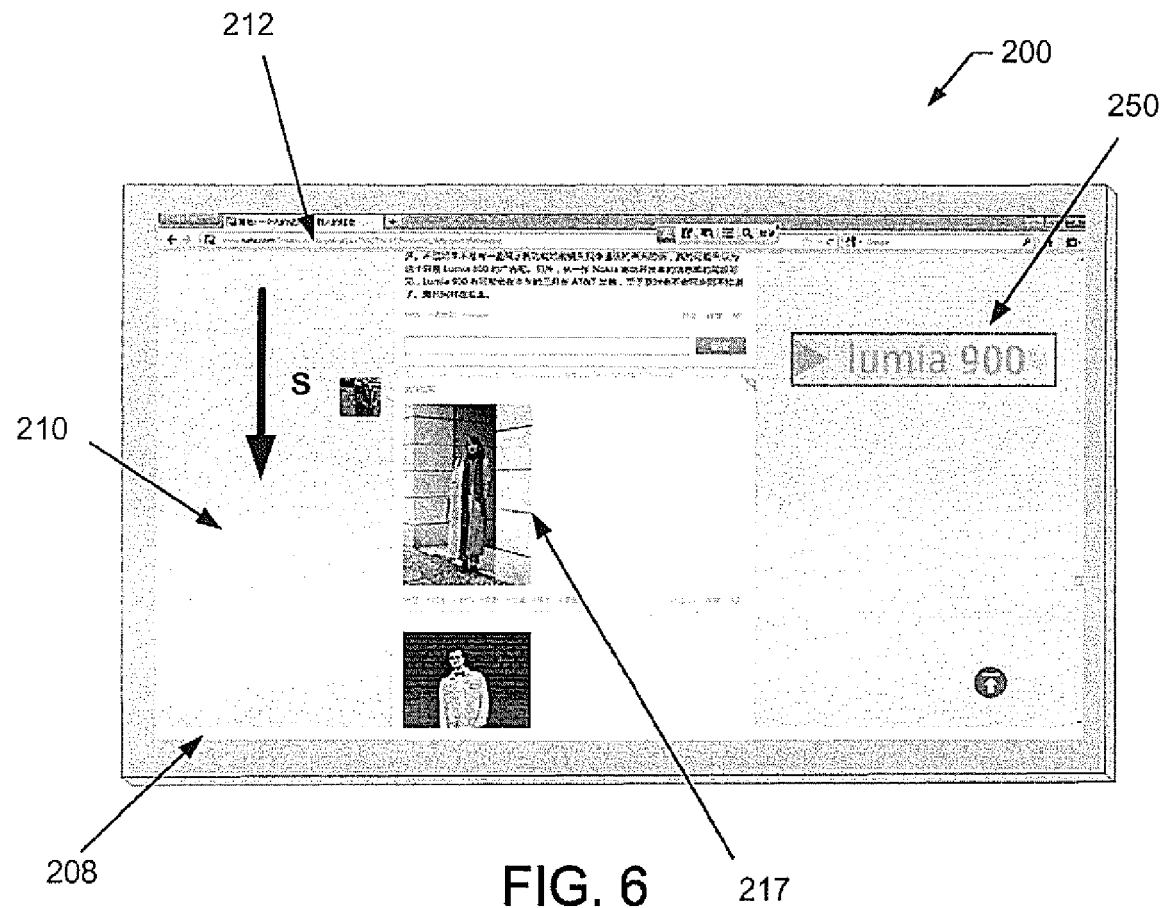
Figure 7:
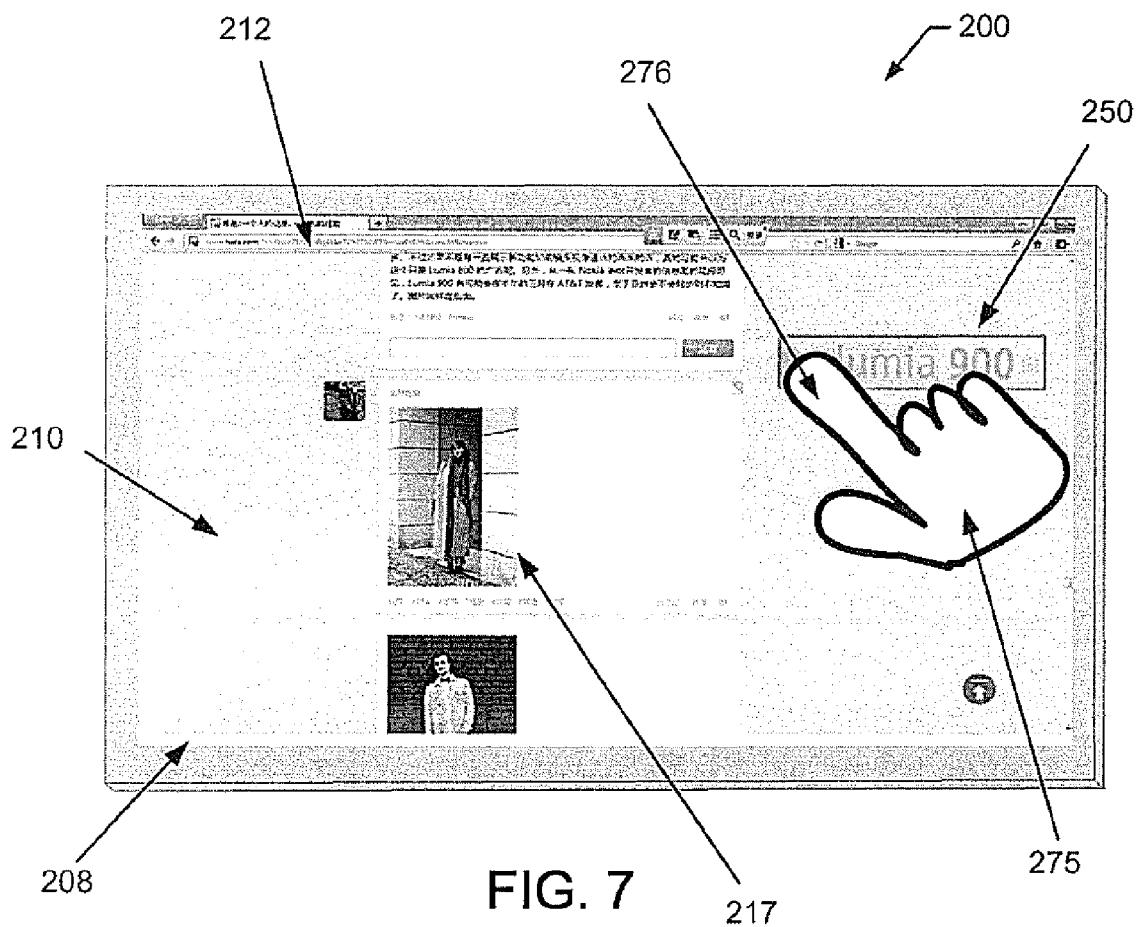
Figure 8:
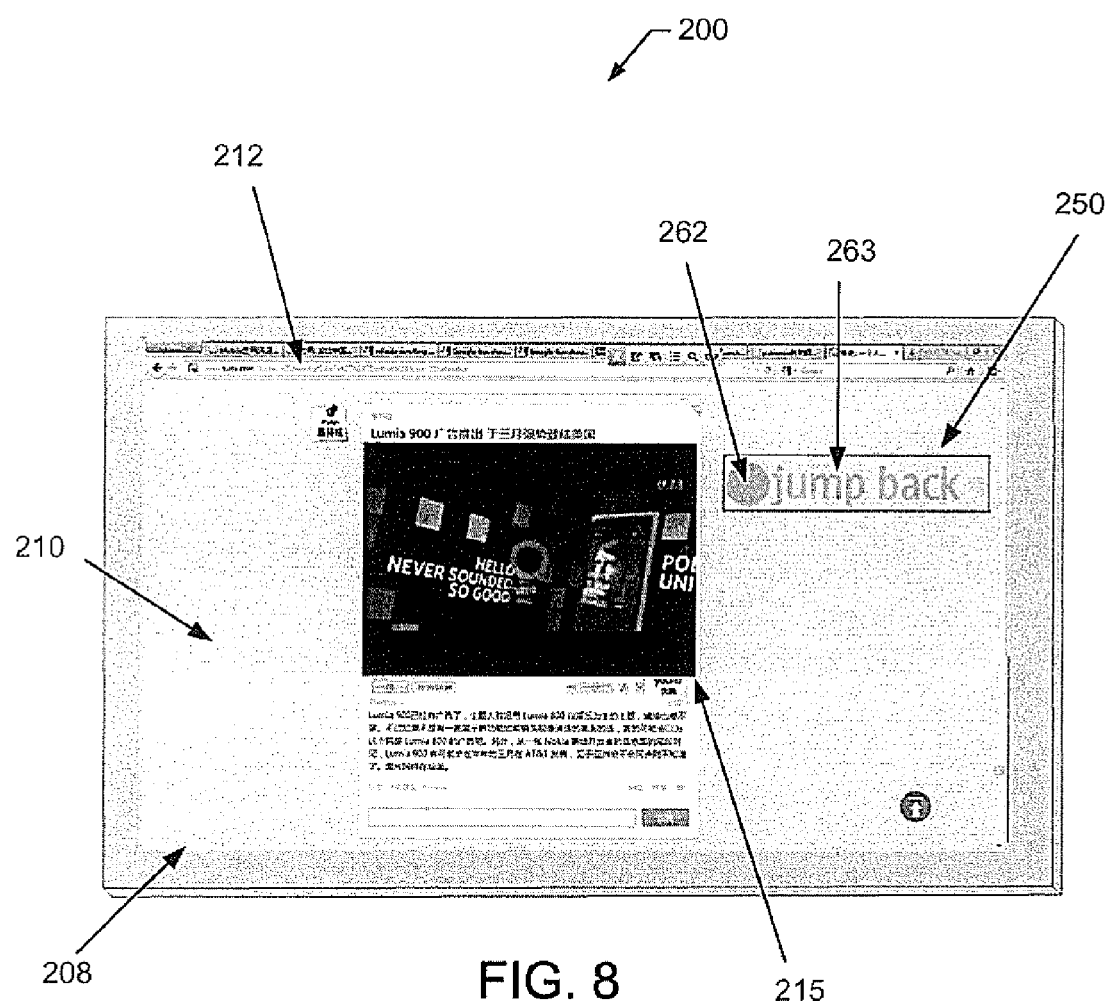
Figure 9A:
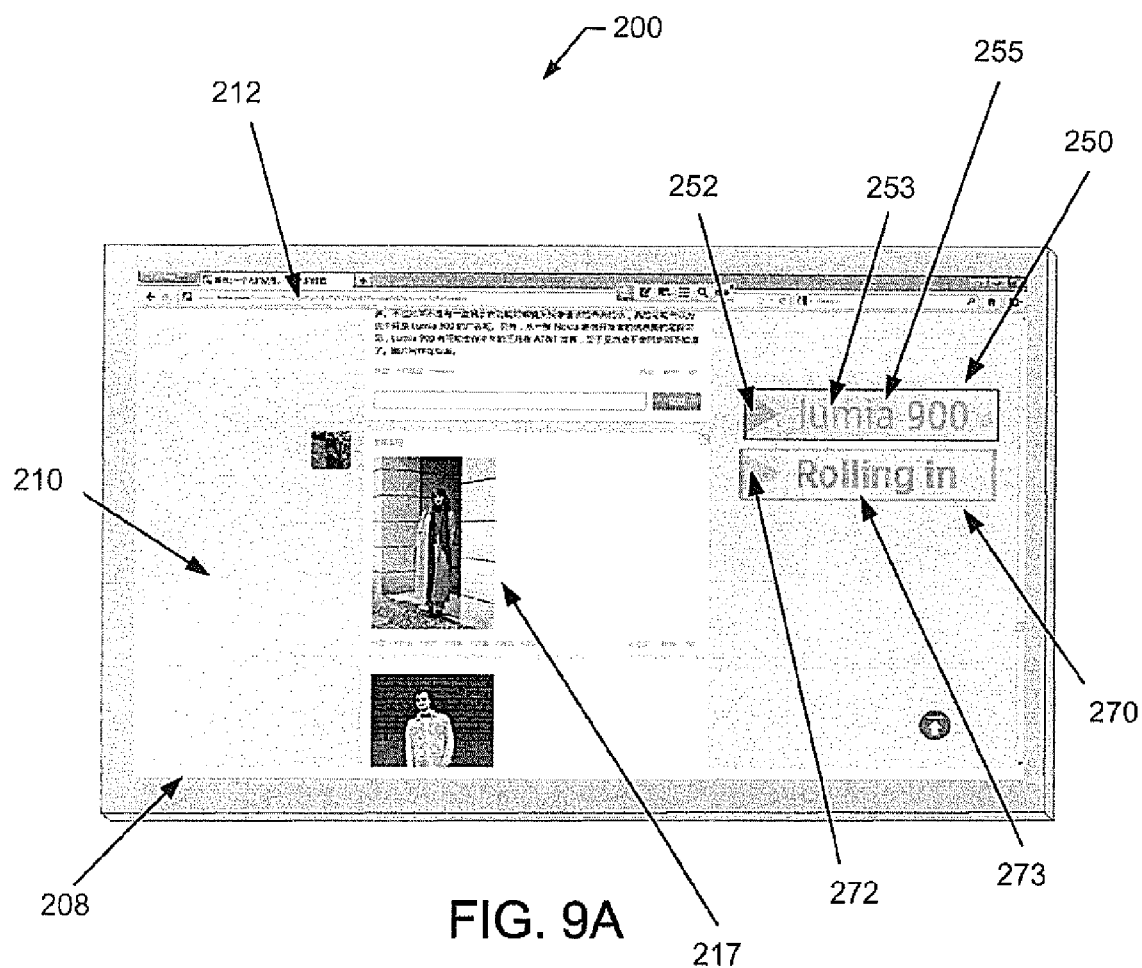
Figure 9B:
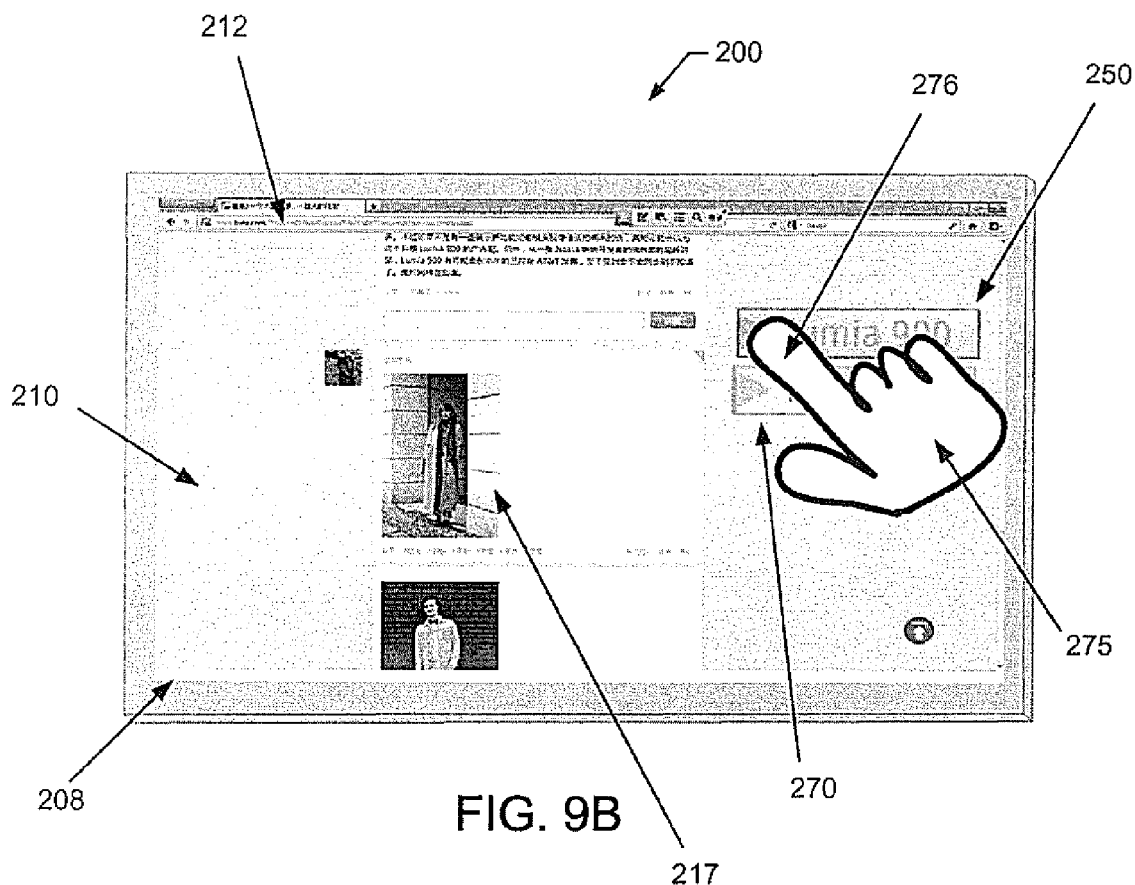
Figure 9C:
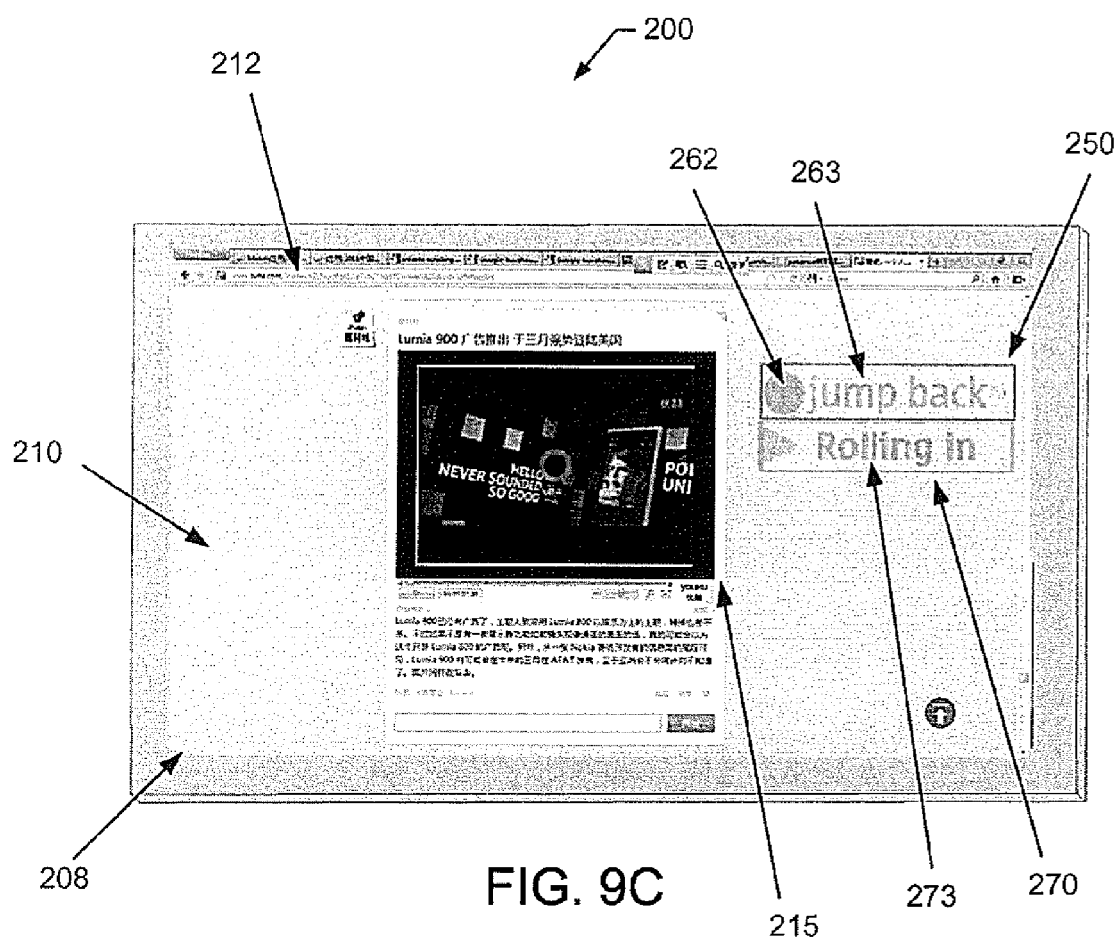
Figure 10:
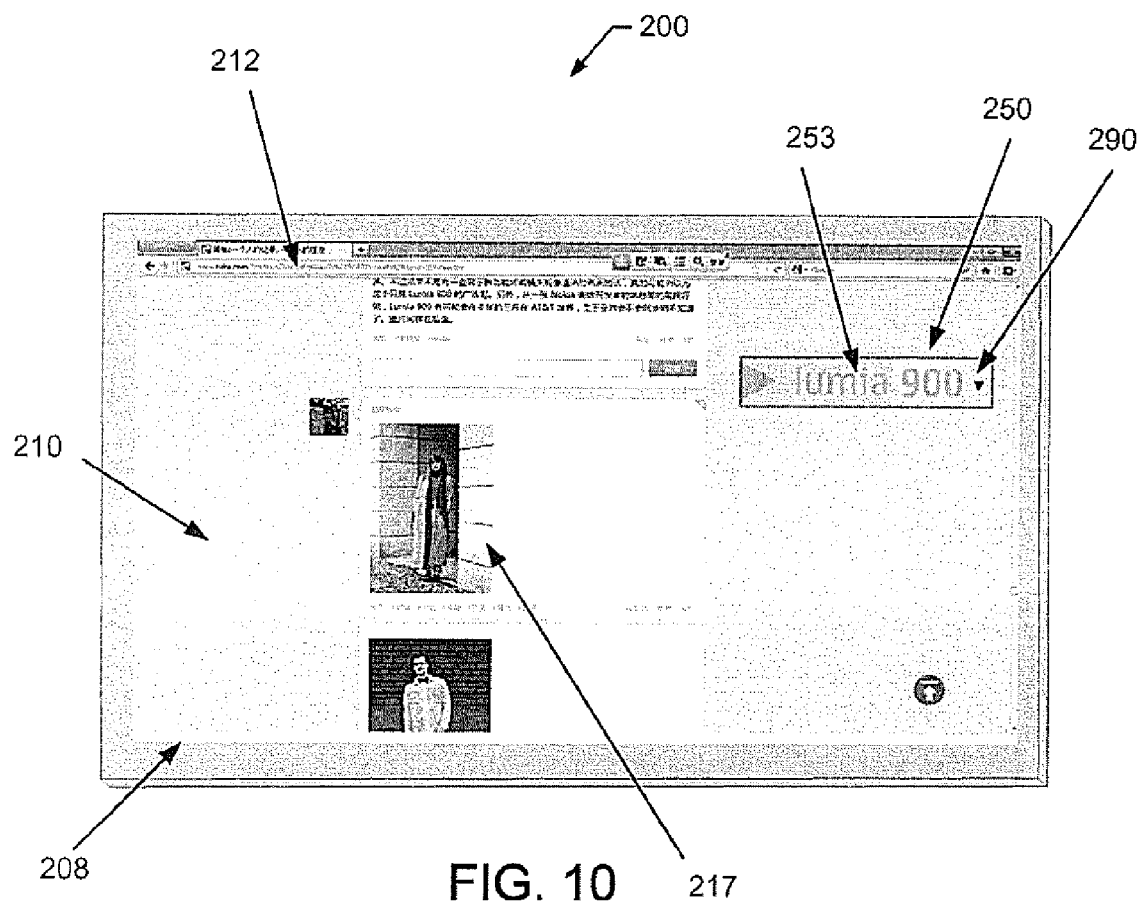
Figure 11A:
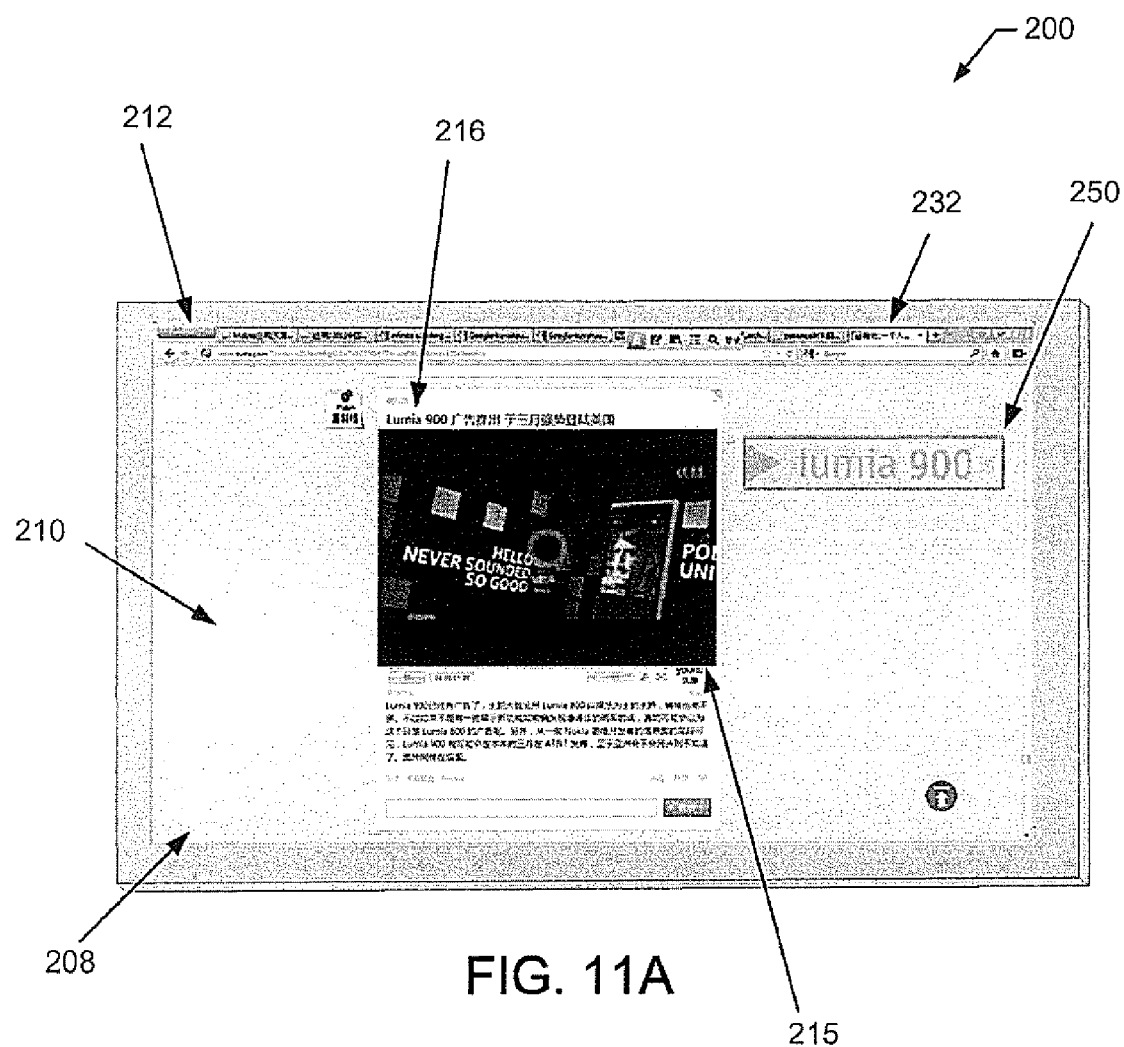
Figure 11B:
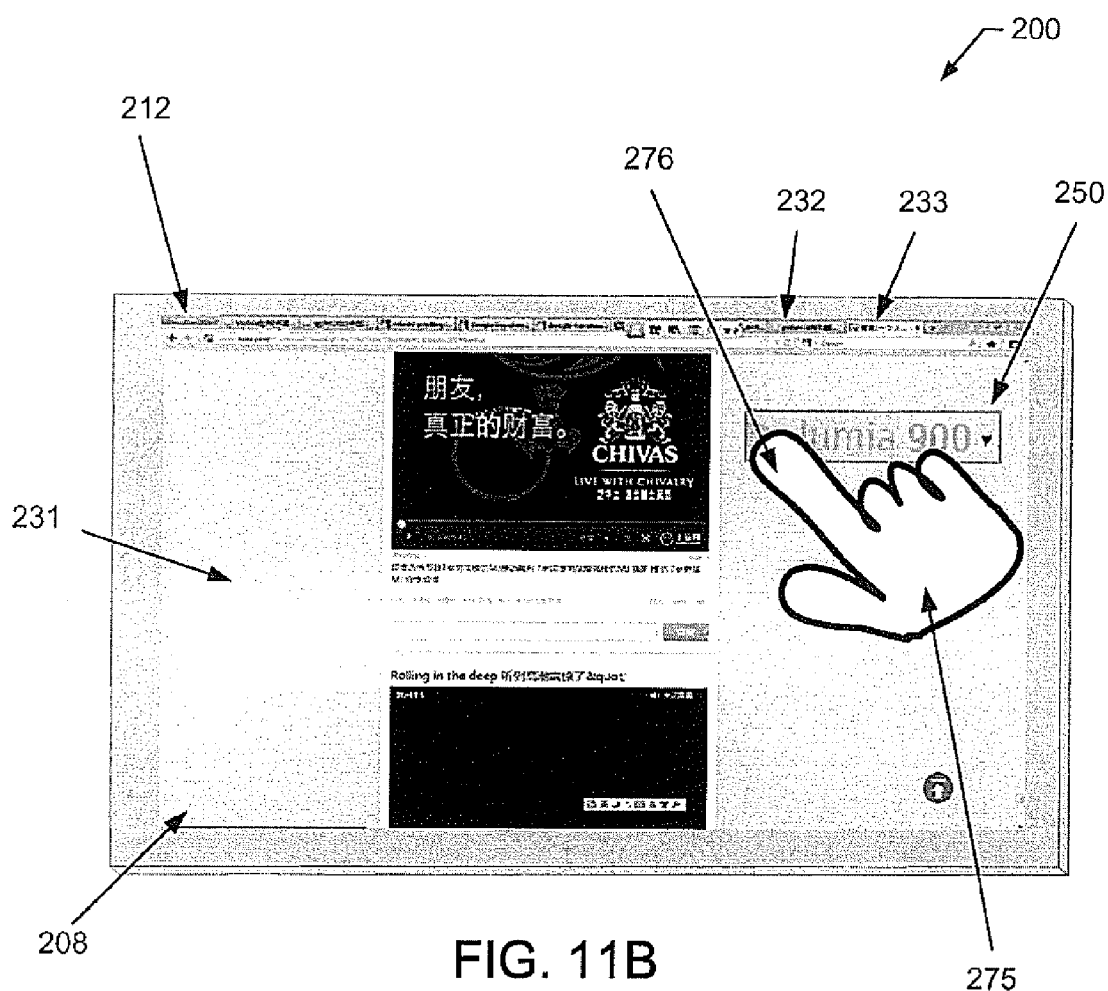
Figure 11C:
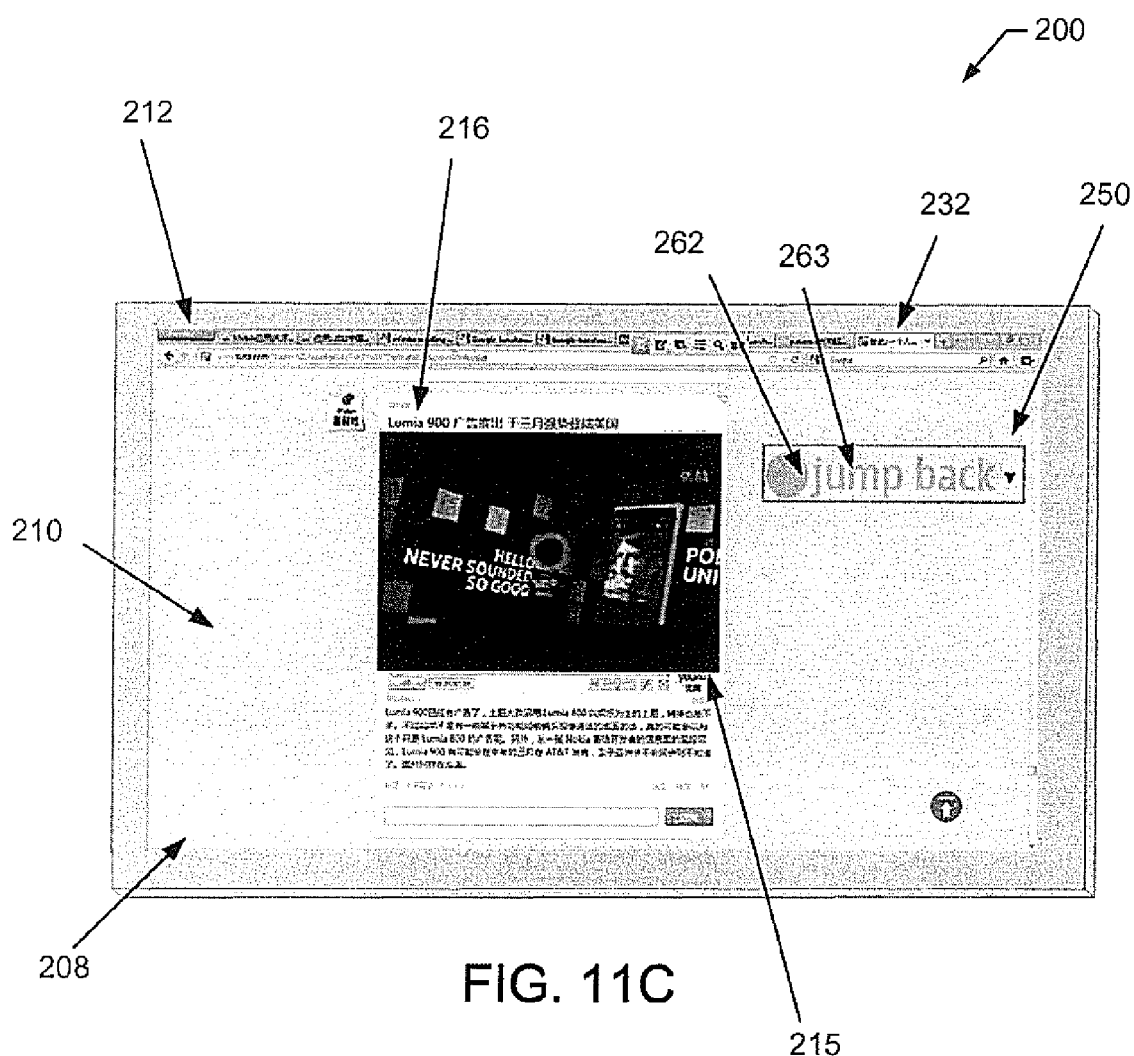
Figure 12:
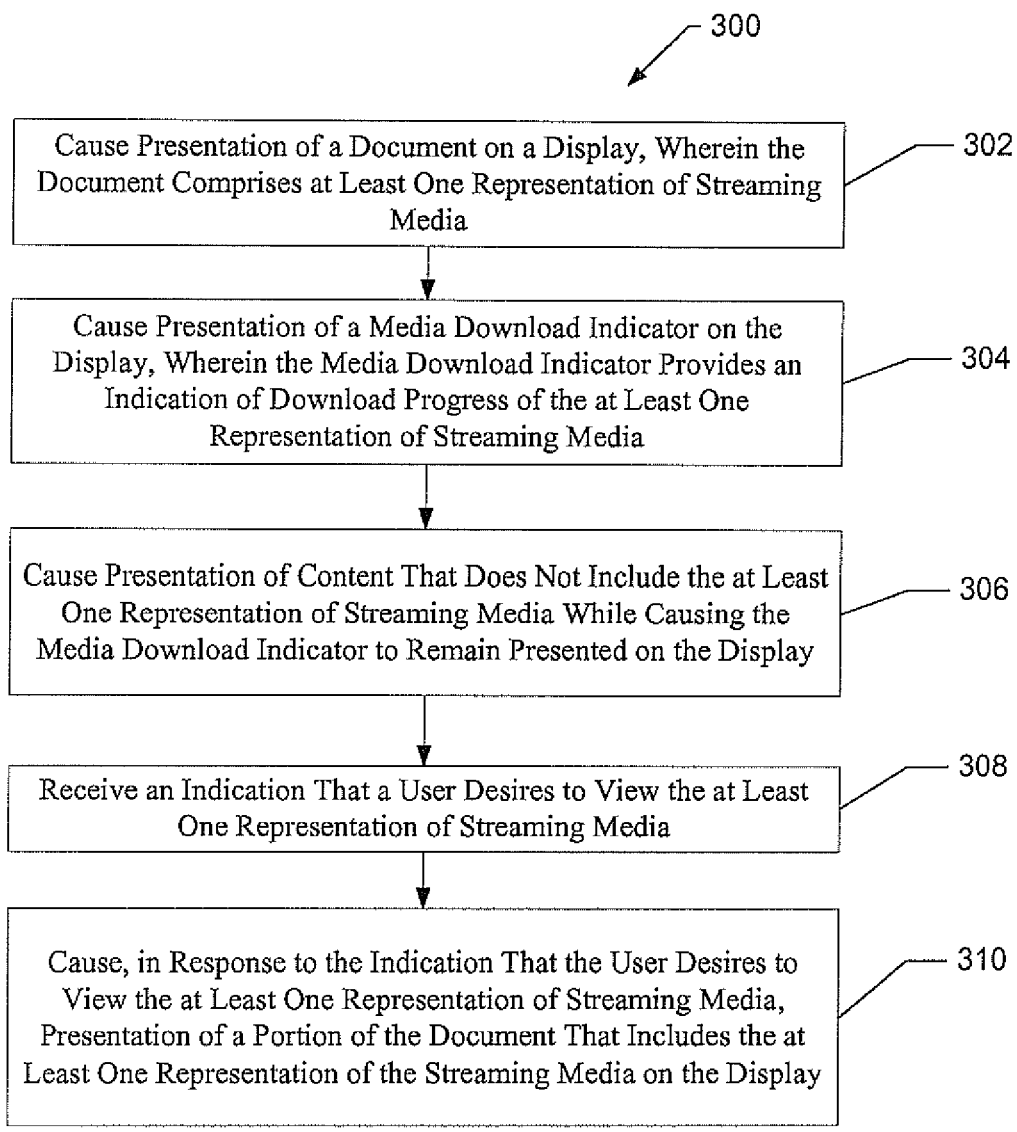
Figure 13:
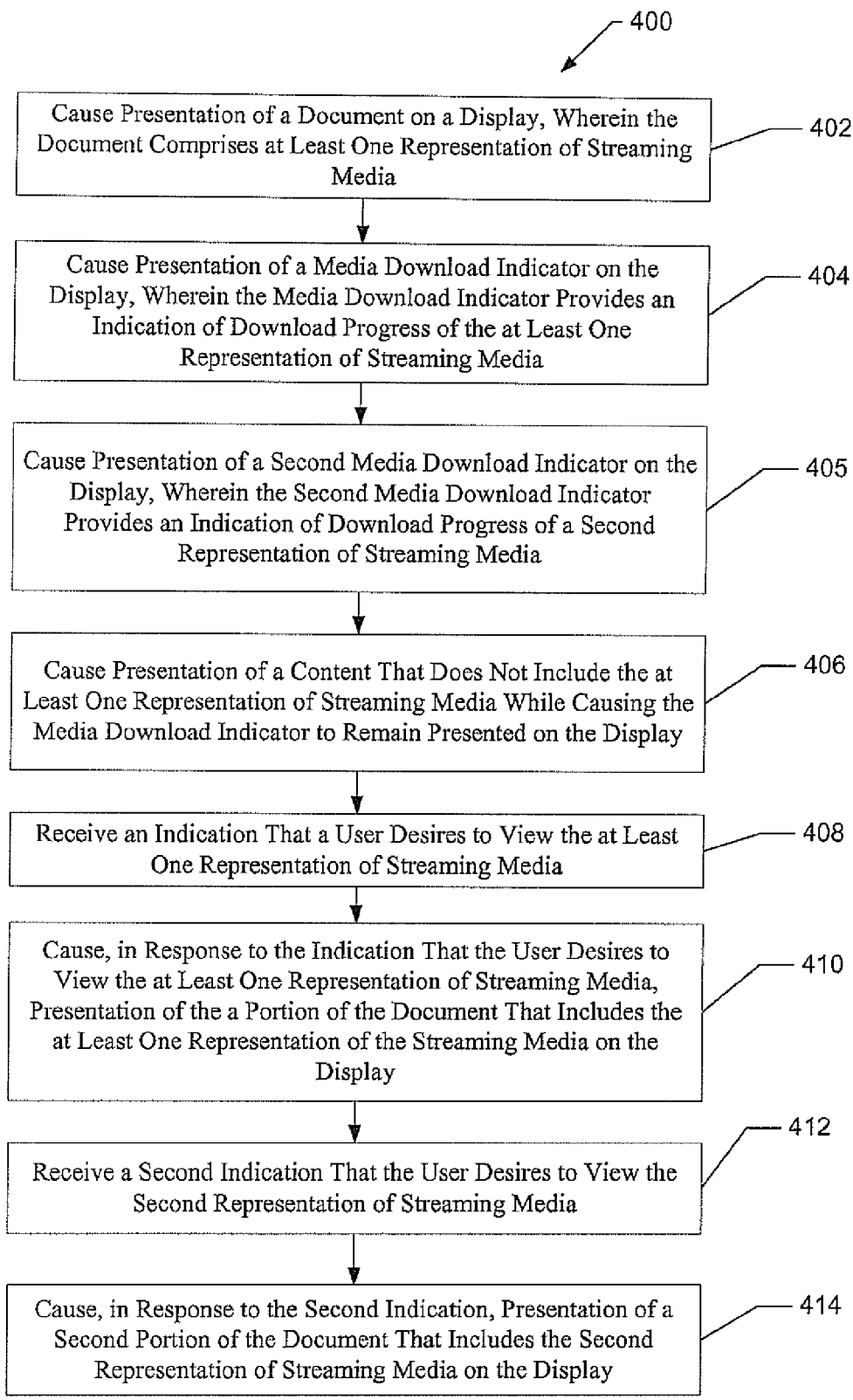

Having thus described certain embodiments of the invention in general terms, reference will now be made to the accompanying drawings, which are not necessarily drawn to scale, and wherein:

FIG. 1 illustrates a block diagram of an apparatus with a user interface according to an example embodiment;

FIG. 2 is a schematic block diagram of a mobile terminal according to an example embodiment;

FIG. 3 illustrates an example device (e.g., the apparatus illustrated in FIG. 1) with a display, wherein a document with a representation of streaming media is presented on the display, in accordance with an example embodiment described herein;

FIG. 4 illustrates the device shown in FIG. 3, wherein a different portion of the document is presented on the display, in accordance with an example embodiment described herein;

FIG. 5A illustrates the device shown in FIG. 3, wherein a media download indicator is also presented on the display within the document, in accordance with an example embodiment described herein;

FIG. 5B illustrates the device shown in FIG. 3, wherein a media download indicator is also presented on the display within a header of the document, in accordance with an example embodiment described herein;

FIG. 6 illustrates the device shown in FIG. 5A, wherein a different portion of the document is presented on the display, in accordance with an example embodiment described herein;

FIG. 7 illustrates the device shown in FIG. 6, wherein a user is selecting the media download indicator, in accordance with an example embodiment described herein;

FIG. 8 illustrates the device shown in FIG. 7, wherein the portion of the document with the representation of streaming media is presented on the display, in accordance with an example embodiment described herein;

FIG. 9A illustrates the device shown in FIG. 3, wherein a different portion of the document is presented on the display and two media download indicators are also presented on the display, in accordance with an example embodiment described herein;

FIG. 9B illustrates the device shown in FIG. 9A, wherein a user is selecting one of the media download indicators, in accordance with an example embodiment described herein;

FIG. 9C illustrates the device shown in FIG. 9B, wherein the portion of the document with the representation of streaming media corresponding to the selected media download indicator is presented on the display, in accordance with an example embodiment described herein;

FIG. 10 illustrates the device shown in FIG. 3, wherein a different portion of the document is presented on the display and a media download indicator with a drop-down menu function is also presented on the display, in accordance with an example embodiment described herein;

FIGS. 11A-11C illustrate use of example embodiments of the media download indicator for improved navigation of streaming media between different documents, in accordance with an example embodiment described herein;

FIG. 12 illustrates a flowchart according to an example method for improved navigation of content including a representation of streaming media, in accordance with an example embodiment described herein; and FIG. 13 illustrates a flowchart according to another example method for improved navigation of content including a representation of streaming media, in accordance with an example embodiment described herein.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "information" and similar terms may be used interchangeably to refer to singular or plural data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of an apparatus 102 for improved navigation of content including a representation of streaming media according to an example embodiment. It will be appreciated that the apparatus 102 is provided as an example of one embodiment and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for facilitating interaction with a user interface, other configurations may also be used to implement embodiments of the present invention.

The apparatus 102 may be embodied as either a fixed device or a mobile device such as a desktop computer, laptop computer, mobile terminal, mobile computer, mobile phone, mobile communication device, game device, digital camera/camcorder, audio/video player, television device, radio receiver, digital video recorder, positioning device, a chipset, a computing device comprising a chipset, any combination thereof, and/or the like. In some example embodiments, the apparatus 102 is embodied as a mobile computing device, such as the mobile terminal illustrated in FIG. 2.

In this regard, FIG. 2 illustrates a block diagram of a mobile terminal 10 representative of one example embodiment of an apparatus 102. It should be understood, however, that the mobile terminal 10 illustrated and hereinafter described is merely illustrative of one type of apparatus 102 that may implement and/or benefit from various example embodiments of the invention and, therefore, should not be taken to limit the scope of the disclosure. While several embodiments of the computing device are illustrated and will be hereinafter described for purposes of example, other types of computing devices, such as mobile telephones, mobile computers, personal digital assistants (PDAs), pagers, laptop computers, desktop computers, gaming devices, positioning devices, tablet computers, televisions, e-papers, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs (e.g., applications), which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The display 28 of the mobile terminal may be of any type appropriate for the electronic device in question with some examples including a plasma display panel (PDP), a liquid crystal display (LCD), a light-emitting diode (LED), an organic light-emitting diode display (OLED), a projector, a holographic display or the like. The display 28 may, for example, comprise a three-dimensional touch display, examples of which will be described further herein below. The user input interface may comprise devices allowing the mobile terminal to receive data, such as a keypad 30, a touch display (e.g., some example embodiments wherein the display 28 is configured as a touch display), a joystick (not shown), and/or other input device. In embodiments including a keypad, the keypad may comprise numeric (0-9) and related keys (#, *), and/or other keys for operating the mobile terminal 10. Alternatively or additionally, the keypad 30 may include a conventional QWERTY keypad arrangement.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the apparatus 102 includes various means for performing the various functions herein described. These means may comprise one or more of a processor 110, memory 112, communication interface 114, user interface 116, or user interface (UI) control circuitry 122. The means of the apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

In some example embodiments, one or more of the means illustrated in FIG. 1 may be embodied as a chip or chip set. In other words, the apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 110, memory 112, communication interface 114, and/or UI control circuitry 122 may be embodied as a chip or chip set. The apparatus 102 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, one or more other types of hardware processors, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In embodiments wherein the apparatus 102 is embodied as a mobile terminal 10, the processor 110 may be embodied as or comprise the processor 20 (shown in FIG. 2). In some example embodiments, the processor 110 is configured to execute instructions stored in the memory 112 or otherwise accessible to the processor 110. These instructions, when executed by the processor 110, may cause the apparatus 102 to perform one or more of the functionalities of the apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 102 is embodied as a mobile terminal 10, the memory 112 may comprise the volatile memory 40 and/or the non-volatile memory 42 (shown in FIG. 2). The memory 112 may be configured to store information, data, applications, instructions, or the like for enabling the apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. The stored information may include, for example, images, content, media content, user data, application data, and/or the like. This stored information may be stored and/or used by the UI control circuitry 122 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another computing device. In some example embodiments, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. In embodiments wherein the apparatus 102 is embodied as a mobile terminal 10, the communication interface 114 may be embodied as or comprise the transmitter 14 and receiver 16 (shown in FIG. 2). The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the apparatus 102 and one or more computing devices may be in communication. As an example, the communication interface 114 may be configured to receive and/or otherwise access content (e.g., web page content, streaming media content, and/or the like) over a network from a server or other content source. The communication interface 114 may additionally be in communication with the memory 112, user interface 116, and/or UI control circuitry 122, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. In embodiments wherein the apparatus 102 is embodied as a mobile terminal 10, the user interface 116 may be embodied as or comprise the display 28 and keypad 30 (shown in FIG. 2). The user interface 116 may be in communication with the memory 112, communication interface 114, and/or UI control circuitry 122, such as via a bus.

The UI control circuitry 122 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. In some example embodiments wherein the UI control circuitry 122 is embodied separately from the processor 110, the UI control circuitry 122 may be in communication with the processor 110. The UI control circuitry 122 may further be in communication with one or more of the memory 112, communication interface 114, or user interface 116, such as via a bus.

The UI control circuitry 122 may be configured to receive user input from a user interface 116, such as a touch display. The user input or signal may carry positional information indicative of the user input. In this regard, the position may comprise a position of the user input in a two-dimensional space, which may be relative to the surface of the touch display user interface. For example, the position may comprise a coordinate position relative to a two-dimensional coordinate system (e.g., an X and Y axis), such that the position may be determined. Accordingly, the UI control circuitry 122 may determine a position of the user input such as for determining a portion of the display to which the user input correlates.

The touch display may also be configured to enable the detection of a hovering gesture input. A hovering gesture input may comprise a gesture input to the touch display without making physical contact with a surface of the touch display, such as a gesture made in a space some distance above/in front of the surface of the touch display. As an example, the touch display may comprise a projected capacitive touch display, which may be configured to enable detection of capacitance of a finger or other input object by which a gesture may be made without physically contacting a display surface. As another example, the touch display may be configured to enable detection of a hovering gesture input through use of acoustic wave touch sensor technology, electromagnetic touch sensing technology, near field imaging technology, optical sensing technology, infrared proximity sensing technology, some combination thereof, or the like.

The apparatus 102, such as the processor 110, may be configured to cause presentation of content, such as a document, on a display. In some embodiments, the apparatus 102 may be configured to cause presentation of a document with at least one representation of streaming media on the display. As noted herein, the apparatus 102 may be configured to perform any number of operations, including presenting content. As used herein, content may refer to any type of information capable of being presented to a user (e.g., a document, media, etc.). Additionally, as used herein, a document may be any type of document, including but not limited to a word document, a portable document format ("pdf"), an excel worksheet, a webpage, etc. A representation of streaming media may include any type of representation (e.g., link, embedded feature, pop-up player, etc.) for a media file that may be streamed (e.g., played from another source). For example, with reference to FIG. 3, a computing device 200 (such as may be embodied as apparatus 102) may include a display 208. The computing device 200 may be configured to cause presentation of the webpage 210. In the depicted embodiment, including the webpage 210 may include a header 212 that includes information (e.g., a web address, etc.) regarding the webpage 210. Additionally, the webpage 210 may include at least one representation of streaming media, such as the video 215.

Depending on the set-up of the document, upon presentation of the document, the at least one representation of streaming media, the streaming media may load automatically or may require a user to select the representation of the streaming media to initiate loading. Either upon selection or automatically upon presentation of the document, the streaming media may begin downloading for eventual playing on the apparatus 102 (e.g., on the user interface 116). However, depending on the file size of the streaming media and the processing power of the apparatus 102, downloading may take a long time (or at least a longer time than the user wishes to wait). As such, a user may become impatient and may want to view other content that may be immediately available.

For example, a user may wish to change presentation of the document to view other content (e.g., scroll through, change to a different page, etc.). This, however, may cause the representation of the streaming media to cease being presented to the user (even while the downloading is occurring). Moreover, once the streaming media is fully downloaded or otherwise able to play for the user, the user may have caused presentation of different content (e.g., a different portion of the document) and, thus, may not be viewing the representation of the streaming media, which is now ready for delivery to the user. Additionally, the user may not be able to easily or quickly return to the streaming media, which may cause the user to become frustrated and/or miss some of the streaming media being played. FIG. 4 illustrates such a situation, with the device 200 presenting a different portion the webpage 210 on the display 208. In particular, the user may have scrolled down the webpage 210, such as along arrow "S". The webpage 210 is now presented with other content (e.g., a picture 217) instead of the representation of streaming media (e.g., video 215 shown in FIG. 3). Thus, once the video 215 shown in FIG. 3 is ready to play for the user, the user, in the depicted embodiment, is now viewing another portion of the webpage 210 without an easy way to return to the video 215.

Embodiments of the present invention provide for improved navigation of content including a representation of streaming media. In particular, the apparatus 102, such as the processor 110, may be configured to cause presentation of a media download indicator on the display. The media download indicator may provide an indication of the download progress of the at least one representation of streaming media. In such a manner, the user may be able to quickly determine the download progress of the streaming media in the document. For example, with reference to FIG. 5A, the computing device 200 may cause presentation of a media download indicator 250. The media download indicator 250 shows a progress bar 255 that indicates the download progress of the video 215. For example, the video 215 may be approximately 60% downloaded as indicated by the approximate distance between 0% downloaded at point "A" and 100% downloaded at point "B".

In some embodiments, the media download indicator may provide a title of the representation of streaming media. The title may enable a user to quickly distinguish the streaming media. Similarly, in some embodiments, the media download indicator may provide an indication of an operation status of the representation of streaming media. In such an embodiment, a user may easily determine whether the streaming media is playing, stopped, paused, etc. For example, with reference to FIG. 5A, the media download indicator 250 presented on the display 208 of the computing device 200 includes a title 253 (e.g., "lumia 900") that corresponds to the title 216 of the video 215 (e.g., the representation of streaming media). Additionally, the media download indicator 250 also includes an operation status 252 (e.g., play). In some embodiments, a user may select the operation status to cause the representation of streaming media to perform a corresponding action. For example, a user may select the operation status 252 shown in FIG. 5A to cause the video 215 to begin playing.

Though the above example embodiments detail data that the media download indicator may provide as a title, operation status, and download progress, other embodiments of the present invention contemplate other data that may be provided (e.g., video length, file size, location in the document, etc.). Along these same lines, the media download indicator may provide additional features as those described herein. For example, the media download indicator may provide an indication (e.g., a notification) when downloading of the representation of streaming media is complete. Additionally, though shown in black and white in the figures, some embodiments of the present invention may provide different colors for different features of the media download indicator and/or for different media download indicators (as illustrated in FIGS. 9A-9C and described in greater detail herein).

In some embodiments, the apparatus 102, such as the processor 110, may be configured to cause presentation of the media download indicator on the display within the presented content (e.g., the document). In some embodiments, the apparatus 102, such as the processor 110, may determine a position on the display that is within the presented content and suitable for the media download indicator and then cause presentation of the media download indicator within that position. For example, in some embodiments, the apparatus 102, such as the processor 110, may cause presentation of the media download indicator in one of the margins of the document. In such a manner, the media download indicator may be presented such that it does not cover up other content being presented. In some embodiments, the position of the media download indicator may be pre-determined. In the example embodiment shown in FIG. 5A, the media download indicator 250 is presented in a margin to the right of content (e.g., video 215) being presented from the webpage 210.

In some embodiments, the apparatus 102, such as the processor 110, may be configured to cause presentation of the media download indicator on the display within a header or a footer of the document. For example, with reference to FIG. 5B, the media download indicator 250 is presented in the header 212 of the webpage 210. In the depicted embodiment, the media download indicator 250 is presented over a portion of the web address.

Though the above example embodiments describe presentation of the media download indicator within the document and/or within the header or footer of the document, other positions are contemplated, as the above examples are not meant to be limiting.

In some embodiments, the apparatus 102, such as the processor 110, may be configured to cause presentation of the media download indicator in response to receiving a selection of at least one representation of streaming media. For example, as noted above, in some cases, a user may select a representation of streaming media to cause it to download for viewing. In such a situation, in some embodiments, the apparatus 102, such as the processor 110, may be configured to cause presentation of the media download indicator in response to such a selection.

In some embodiments, the apparatus 102, such as the processor 110, may be configured to cause presentation of the media download indicator automatically in an instance in which the document includes at least one representation of streaming media. For example, a document may be presented on the display of the apparatus 102. The apparatus 102, such as the processor 110, may determine that the document includes at least one representation of streaming media, and in response, it may cause presentation of the media download indicator automatically. Such an embodiment, as described in greater detail herein, may enable a user to view, control, and even navigate between available representations of streaming media within the document upon presentation of the document to the user.

The apparatus 102, such as the processor 110, may be configured to cause presentation of content (e.g., a portion of the document) on the display that does not include the at least one representation of streaming media while causing the media download indicator to remain presented on the display. For example, as noted above with respect to FIG. 4, a user may move through (e.g., scroll through) the document to view other content besides the content including the representation of streaming media. In such a circumstance, some embodiments of the present invention cause the media download indicator to remain presented on the display even though the representation of the streaming media is no longer visible. Thus, no matter which content is being presented, the media download indicator may also be presented. For example, with reference to FIG. 6, the computing device 200 may be presenting a different portion of the webpage 210, as evidenced by the picture 217. Thus, the video 215 (shown in FIG. 5A) may no longer be visible. However, the media download indicator 250 that provides an indication of the download progress of the video 215 is still presented.

In some embodiments, the apparatus 102, such as the processor 110, may be configured to permit scrolling through the document while the media download indicator remains presented on the display. For example, a user may scroll through the webpage 210 presented on the display 208 of the device 200 shown in FIG. 6. In the depicted embodiment, the user has scrolled down from the video 215 (shown in FIG. 5A), such as along arrow "S". In such an embodiment, the user may continue to scroll through the document and the media download indicator may remain presented on the display (e.g., visible to the user).

The apparatus 102, such as the processor 110, may be configured to receive an indication that the user desires to view the at least one representation of streaming media. Such an indication, in some embodiments, may include user input indicating a desire to view the at least one representation of streaming media. Moreover, in some embodiments, the user input may be directed toward the media download indicator. For example, as illustrated in FIG. 7, the user 275 may provide input (e.g., with their finger 276) to the media download indicator 250 as an indication that the user desires to view the video 215 (e.g., the representation of streaming media).

In response to the indication that the user desires to view the at least one representation of streaming media, the apparatus 102, such as the processor 110, may be configured to cause presentation of a portion of the document that includes the at least one representation of streaming media on the display. Said differently, in some embodiments, upon receipt of an indication to view the representation of streaming media, the apparatus 102, such as the processor 110, may cause presentation of the document to change back to the portion that includes the representation of streaming media. For example, with reference to FIGS. 7 and 8, once the user 275 selects the media download indicator 250 (shown in FIG. 7), the computing device 200 will cause presentation of the webpage 210 to return to a portion that includes the video 215 (shown in FIG. 8).

In some embodiments, the media download indicator may enable the user to return to the portion of the document that was presented before returning to the representation of streaming media. For example, in the depicted embodiment of FIG. 8, the media download indicator 250 has changed to a "jump back" function 263 with a circle indicator 262. In such an embodiment, the user may select the media download indicator 250 to return to the previously presented portion of the webpage 210 (e.g., with picture 217), as shown in FIG. 7. As such, certain embodiments of the present invention provide a user with the ability to efficiently navigate through a document with at least one representation of streaming media.

In some other embodiments, in response to the indication that the user desires to view the at least one representation of streaming media (e.g. upon receiving the user input directed toward the media download indicator to view the at least one representation of streaming media), the apparatus 102, such as the processor 110, may cause the streaming media to be presented on the portion of the document that is currently presented (e.g., without causing presentation of the portion of the document that includes the representation of streaming media to resume). For example, in some embodiments, the presentation of the streaming media (e.g. the video playing window) may be overlaid onto the portion of the document that is currently being presented (e.g., the portion of the document that the user is currently viewing). In some embodiments, the presentation of the streaming media (e.g. the video playing window) may be positioned under or above the media download indicator.

In some circumstances, a document may have more than one representation of streaming media. In such a circumstance, in some embodiments, that apparatus 102 may be configured to cause presentation of a media download indicator for each representation of streaming media. For example, with reference to FIG. 9A, the computing device 200 may determine that the webpage 210 has two representations of streaming media, namely the video 215, entitled "lumia 900" (shown in FIG. 5A), and another video, entitled "Rolling in" (not shown). The device 200 may be configured to cause presentation of a first media download indicator 250 for the video 215, entitled "lumia 900," and a second media download indicator 270 for the other video, entitled "Rolling in." The first media download indicator 250 may provide the title 253 and an operation status 252, along with the download progress 255 for the video 215. The second media download indicator 270 may provide the title 273 and an operation status 272, along with the download progress (not started) for the video entitled "Rolling in." As is consistent with embodiments of the present invention described herein, both the first media download indicator 250 and second media download indicator 270 may remain presented while different content, such as a different portion of the webpage 210, is being presented.

As is consistent with example embodiments described above, the apparatus 102, such as the processor 110, may be configured to receive an indication that the user desires to view at least one representation of streaming media, and in response, cause presentation of a portion of the document that includes the at least one representation of streaming media on the display. For example, as illustrated in FIG. 9B, the user 275 may provide input (e.g., with their finger 276) to the media download indicator 250 as an indication that the user desires to view the video 215 (e.g., the representation of streaming media). Then, once the user 275 selects the media download indicator 250, the device 200 may cause presentation of the webpage 210 to return to a portion that includes the video 215 (shown in FIG. 9C). Similarly, in some embodiments, the apparatus 102, such as the processor 110, may be configured to receive an indication that the user desires to view the second representation of streaming media, and in response, cause presentation of the document to return to a second portion of the document that includes the second representation of streaming media.

Additionally or alternatively, in some embodiments, in circumstances in which more than one representation of streaming media is included in a document, the apparatus 102, such as the processor 110, may be configured to enable the user to select between the available representations of streaming media on the media download indicator. For example, in some embodiments, the apparatus 102, such as the processor 110, may be configured to cause presentation of a media download indicator with a "drop-down" menu function for selecting between more than one representation of streaming media. Such a "drop-down" menu function is illustrated by the down arrow 290 on the media download indicator 250 shown in FIG. 10. A user may select this down arrow 290 and a preview of each available (or a certain number of available) representations of streaming media for the document may be presented to the user for selection. For example, a user may select the down arrow 290 and a preview of the media download indicator for the video entitled "Rolling in" (shown in FIG. 9A) may be presented. In other embodiments, the apparatus 102, such as the processor 110, may be configured to scroll through the available representations of streaming media without a drop-down menu being presented to the user.

As noted above, downloading of streaming media may be time consuming, and, often, a user may wish to view other content while the downloading is occurring. In some cases, a user may wish to open another document for viewing (e.g., open another webpage). As such, some embodiments of the present invention enable improved navigation between documents, such that a user may easily return to the streaming media that is being downloaded in a document that is different than the one being currently viewed. FIGS. 11A-11C illustrate one example embodiment of a media download indicator for improved navigation of streaming media between different documents.

With reference to FIG. 11A, the device 200 may present a webpage 210 with streaming media (e.g., video 215) and a corresponding media download indicator 250 (as is consistent with described embodiments herein). As indicated by the header 212 of the browser for the webpage 210, the device 200 may be configured to display other documents (e.g., webpages). For example, the webpage browser may include a tab for each different webpage (e.g., tab 232 represents the currently presented webpage 210).

In some situations, as noted above, the user may desire to view a different document (e.g., a different webpage), such as while the streaming media is downloading. For example, FIG. 11B illustrates the device 200 presenting a different webpage 231. This webpage 231 may correspond to tab 233 in the webpage browser (shown in the header 212). Additionally, the media download indicator 250 may be presented on the currently presented webpage 231, even though the representation of the corresponding streaming media (e.g., video 215) is available on the webpage 210 that is not currently displayed. For example, tab 232, which corresponds to webpage 210, is currently greyed out in the header 212. The user 275 may wish to view the streaming media and, thus, may provide input to the media download indicator 250, such as by selecting the media download indicator 250.

In response to the user providing input to the media download indicator, the apparatus 102 may be configured to cause presentation of the document with the corresponding streaming media on the display. In some embodiments, the apparatus may be configured to cause presentation of the portion of the document that includes the representation of the streaming media on the display in response to receiving the user input. Thus, the apparatus 102 may be configured to jump (e.g., quickly navigate) between documents. For example, once the user selects the media download indicator 250 in FIG. 11B, the device 200 may cause presentation of the webpage 210 and the streaming media (e.g., 215) on the display (shown in FIG. 11C). Additionally, the media download indicator 250 has changed to a "jump back" function 263 with a circle indicator 262. In such an embodiment, the user may select the media download indicator 250 to return to the previously presented webpage 231, as shown in FIG. 11B. As such, certain embodiments of the present invention provide a user with the ability to efficiently navigate through different documents with at least one representation of streaming media in one of the documents.

Embodiments of the present invention provide methods, apparatus and computer program products for improved navigation of content including a representation of streaming media. Various examples of the operations performed in accordance with embodiments of the present invention will now be provided with reference to FIGS. 12-13.

FIG. 12 illustrates a flowchart according to an example method for improved navigation of content including a representation of streaming media according to an example embodiment 300. The operations illustrated in and described with respect to FIG. 12 may, for example, be performed by, with the assistance of, and/or under the control of one or more of the processor 110, memory 112, communication interface 114, user interface 116, or UI control circuitry 122. Operation 302 may comprise causing presentation of a document on a display, wherein the document comprises at least one representation of streaming media. The processor 110, user interface 116, and/or UI control circuitry 122 may, for example, provide means for performing operation 302. Operation 304 may comprise causing presentation of a media download indicator on the display, wherein the media download indicator provides an indication of download progress of the at least one representation of streaming media. The processor 110, user interface 116, and/or UI control circuitry 122 may, for example, provide means for performing operation 304. Operation 306 may comprise causing presentation of content that does not include the at least one representation of streaming media while causing the media download indicator to remain presented on the display. The processor 110, user interface 116, and/or UI control circuitry 122 may, for example, provide means for performing operation 306.

Operation 308 may comprise receiving an indication that a user desires to view the at least one representation of streaming media. The processor 110, communication interface 114, user interface 116, and/or UI control circuitry 122 may, for example, provide means for performing operation 308. Operation 310 may comprise causing, in response to the indication that the user desires to view the at least one representation of streaming media, presentation of a portion of the document that includes the at least one representation of the streaming media on the display. The processor 110, user interface 116, and/or UI control circuitry 122 may, for example, provide means for performing operation 310.

FIG. 13 illustrates a flowchart according to an example method for improved navigation of content including a representation of streaming media according to an example embodiment 400. The operations illustrated in and described with respect to FIG. 13 may, for example, be performed by, with the assistance of, and/or under the control of one or more of the processor 110, memory 112, communication interface 114, user interface 116, or UI control circuitry 122. Operation 402 may comprise causing presentation of a document on a display, wherein the document comprises at least one representation of streaming media. The processor 110, user interface 116, and/or UI control circuitry 122 may, for example, provide means for performing operation 402. Operation 404 may comprise causing presentation of a media download indicator on the display, wherein the media download indicator provides an indication of download progress of the at least one representation of streaming media. The processor 110, user interface 116, and/or UI control circuitry 122 may, for example, provide means for performing operation 404. Operation 405 may comprise causing presentation of a second media download indicator on the display, wherein the second media download indicator provides an indication of download progress of a second representation of streaming media. The processor 110, user interface 116, and/or UI control circuitry 122 may, for example, provide means for performing operation 405. Operation 406 may comprise causing presentation of content that does not include the at least one representation of streaming media while causing the media download indicator to remain presented on the display. The processor 110, user interface 116, and/or UI control circuitry 122 may, for example, provide means for performing operation 406.

Operation 408 may comprise receiving an indication that a user desires to view the at least one representation of streaming media. The processor 110, communication interface 114, user interface 116, and/or UI control circuitry 122 may, for example, provide means for performing operation 408. Operation 410 may comprise causing, in response to the indication that the user desires to view the at least one representation of streaming media, presentation of a portion of the document that includes the at least one representation of the streaming media on the display. The processor 110, user interface 116, and/or UI control circuitry 122 may, for example, provide means for performing operation 410.

Operation 412 may comprise receiving a second indication that a user desires to view the second representation of streaming media. The processor 110, communication interface 114, user interface 116, and/or UI control circuitry 122 may, for example, provide means for performing operation 412. Operation 414 may comprise causing, in response to the second indication, presentation of a portion of the document that includes the second representation of the streaming media on the display. The processor 110, user interface 116, and/or UI control circuitry 122 may, for example, provide means for performing operation 414.

FIGS. 12-13 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, an apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 110) may provide all or a portion of the elements. In another embodiment, all or a portion of the elements may be configured by and operate under control of a computer program product. The computer program product for performing the methods of an example embodiment of the invention includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
   causing presentation of a document on a display, wherein the document comprises at least one representation of streaming media;
   causing presentation of a media download indicator on the display, wherein the media download indicator provides an indication of download progress of the at least one representation of streaming media;
   causing presentation of content that does not include the at least one representation of streaming media while causing the media download indicator to remain presented on the display;
   receiving an indication that a user desires to view the at least one representation of streaming media after causing the presentation of the content that does not include the at least one representation of streaming media; and
   causing, in response to the indication that the user desires to view the at least one representation of streaming media, presentation of a portion of the document that includes the at least one representation of streaming media on the display.

2. The method according to claim 1, wherein causing the presentation of the content that does not include the at least one representation of streaming media while causing the media download indicator to remain presented on the display comprises causing permitting scrolling through the document while the media download indicator remains presented on the display.

3. The method according to claim 1, wherein causing presentation of the media download indicator on the display comprises causing the presentation of the media download indicator on the display within the document.

4. The method according to claim 1, wherein causing the presentation of the media download indicator on the display comprises causing the presentation of the media download indicator on the display within a header or a footer of the document.

5. The method according to claim 1, wherein causing the presentation of the media download indicator on the display comprises causing the presentation of the media download indicator on the display in response to receiving a selection of the at least one representation of streaming media.

6. The method according to claim 1, wherein causing the presentation of the media download indicator on the display comprises automatically causing the presentation of the media download indicator on the display in response to the document comprising the at least one representation of streaming media.

7. The method according to claim 1, wherein the media download indicator provides an indication of an operation status of the at least one representation of streaming media.

8. The method according to claim 1, wherein the media download indicator provides a title of the at least one representation of streaming media.

9. The method according to claim 1, further comprising:
causing presentation of a second media download indicator on the display, wherein the second media download indicator provides an indication of download progress of a second representation of streaming media;
receiving a second indication that the user desires to view the second representation of streaming media; and
causing, in response to the second indication, presentation of a second portion of the document that includes the second representation of streaming media on the display.

10. The method according to claim 1, wherein the media download indicator provides a function for scrolling between more than one representations of streaming media.

11. The method according to claim 1, wherein causing the presentation of the content that does not include the at least one representation of streaming media while causing the media download indicator to remain presented on the display comprises causing presentation of a portion of the document that does not include the at least one representation of streaming media while causing the media download indicator to remain presented on the display.

12. The method according to claim 1, wherein causing the presentation of the content that does not include the at least one representation of streaming media while causing the media download indicator to remain presented on the display comprises causing presentation of a second document that does not include the at least one representation of streaming media while causing the media download indicator to remain presented on the display.

13. An apparatus comprising a processor and a memory including computer program code, that when executed by the processor, causes the apparatus to:
cause presentation of a document on a display, wherein the document comprises at least one representation of streaming media;
cause presentation of a media download indicator on the display, wherein the media download indicator provides an indication of download progress of the at least one representation of streaming media;
cause presentation of content that does not include the at least one representation of streaming media while causing the media download indicator to remain presented on the display;
receive an indication that a user desires to view the at least one representation of streaming media after causing the presentation of the content that does not include the at least one representation of streaming media; and
cause, in response to the indication that the user desires to view the at least one representation of streaming media, presentation of a portion of the document that includes the at least one representation of streaming media on the display.

14. The apparatus of claim 13, wherein the computer program code, when executed by the processor, further causes the apparatus to cause the presentation of the content that does not include the at least one representation of streaming media while causing the media download indicator to remain presented on the display by permitting scrolling through the document while the media download indicator remains presented on the display.

15. The apparatus of claim 13, wherein the computer program code, when executed by the processor, further causes the apparatus to cause the presentation of the media download indicator on the display by causing the presentation of the media download indicator on the display within the document.

16. The apparatus of claim 13, wherein the computer program code, when executed by the processor, further causes the apparatus to cause the presentation of the media download indicator on the display by causing the presentation of the media download indicator on the display within a header or a footer of the document.

17. The apparatus of claim 13, wherein the computer program code, when executed by the processor, further causes the apparatus to cause the presentation of the media download indicator on the display by causing the presentation of the media download indicator on the display in response to receiving a selection of the at least one representation of streaming media.

18. The apparatus of claim 13, wherein the computer program code, when executed by the processor, further causes the apparatus to cause the presentation of the media download indicator on the display by automatically causing the presentation of the media download indicator on the display in response to the document comprising at least one representation of streaming media.

19. A non-transitory computer readable medium encoded with computer program instructions that when executed by one or more processors, cause an apparatus to:
cause presentation of a document on a display, wherein the document comprises at least one representation of streaming media;
cause presentation of a media download indicator on the display, wherein the media download indicator provides an indication of download progress of the at least one representation of streaming media;
cause presentation of content that does not include the at least one representation of streaming media while causing the media download indicator to remain presented on the display;
receive an indication that a user desires to view the at least one representation of streaming media after causing the presentation of the content that does not include the at least one representation of streaming media; and
cause, in response to the indication that the user desires to view the at least one representation of streaming media, presentation of a portion of the document that includes the at least one representation of streaming media on the display.

20. The non-transitory computer readable medium of claim 19, wherein the computer program instructions, when executed by the one or more processors, cause the apparatus to cause the presentation of the content that does not include the at least one representation of streaming media while causing the media download indicator to remain presented on the display by permitting scrolling through the document while the media download indicator remains presented on the display.

\* \* \* \* \*

UNITED STATES PATENT AND TRADEMARK OFFICE
CERTIFICATE OF CORRECTION

PATENT NO. : 9,288,247 B2
APPLICATION NO. : 14/400332
DATED : March 15, 2016
INVENTOR(S) : Huanglingzi Liu et al.

It is certified that error appears in the above-identified patent and that said Letters Patent is hereby corrected as shown below:

On the Title Page, Column 1, (75) Inventors, Line 2
    Please delete "Huanglingzi Liu, Beijing (CN);
                Yonggang Guo, Beijing (CN)"

and replace with -- Huanglingzi Liu, Beijing (CN);
              Yonggang Guo, Beijing (CN);
              Yongguang Guo, Beijing (CN) --

Signed and Sealed this
Twenty-sixth Day of July, 2016

Michelle K. Lee
*Director of the United States Patent and Trademark Office*